Patented May 24, 1949

2,470,876

UNITED STATES PATENT OFFICE 2,470,876
PREPARATION OF ALIPHATIC ACIDS

Roderick S. Spindt, Gibsonia, and Donald R. Stevens, Wilkinsburg, Pa., assignors to Gulf Research & Development Company, Pittsburgh, Pa., a corporation of Delaware No Drawing. Application September 26, 1947, Serial No. 776,412

16 Claims. (Cl. 260—540)

This invention relates to the preparation of organic acids of the aliphatic series, and in particular concerns a process for preparing such acids from sulfurized hydrocarbon compounds.

It is known that tertiary mono-olefines such as isobutylene, trimethylethylene, di-isobutylene, etc., may be reacted with sulfur at elevated temperatures and pressures to form products from which may be isolated compounds having the general formula $C_nH_{2n-4}S_3$, wherein $n$ represents the number of carbon atoms in the olefine subjected to the sulfurization reaction. In co-pending application Serial No. 733,197, filed March 7, 1947, there is disclosed the compound $C_4H_4S_3$ formed by reacting isobutylene with sulfur, and in co-pending application Serial No. 733,196, filed March 7, 1947, there is disclosed two isomeric compounds of the formula $C_8H_{12}S_3$ formed by reacting di-isobutylene with sulfur. Similarly, the compound $C_5H_6S_3$ may be obtained by reacting trimethylethylene with sulfur.

The present invention is based on the discoverey that the above and related sulfur-containing compounds undergo hydrolysis by aqueous alkaline agents to form aliphatic carboxylic acids. The sulfurized olefines of lower molecular weight, i. e., those containing 4-5 carbon atoms, hydrolyze to form simple straight-chain acids, such as formic, acetic, and propionic acids, or mixtures thereof. The higher molecular weight products, however, hydrolyze to form branched-chain acids, many of which have heretofore been obtainable only by costly and commercially unsatisfactory syntheses. Thus, for example, the sulfurized di-isobutylene isomer $C_8H_{12}S_3$ which melts at about 80° C. undergoes hydrolysis according to the invention to form trimethyl-acetic acid in good yield. Heretofore, this acid has been obtainable only by means of a Grignard-type synthesis or by the oxidation of pinacolone. The invention, however, is not limited to the production of such branched-chain acids, but consists broadly in the alkaline hydrolysis of sulfurized tertiary mono-olefines to form carboxylic acids of the aliphatic series.

The sulfurized olefine products which may be hydrolyzed according to the invention to produce aliphatic acids are the products obtained by reacting tertiary mono-olefines of relatively low molecular weight, i. e., those containing from 4 to 16 carbon atoms, such as isobutylene, di-isobutylene, trimethylethylene, tri-isobutylene, tetra-isobutylene, etc., with elemental sulfur at temperatures of about 140°–350° C. under autogenous pressure. These products are initially obtained as viscous liquids or oils from which may be isolated a variety of sulfur-containing compounds, including the pure crystalline $C_nH_{2n-4}S_3$ compounds mentioned above. They are not to be confused with the resinous or rubber-like products of relatively high molecular weight obtained by treating polymerized olefines with sulfur or sulfur chloride since such products are notably resistant to attack by alkalies. For the purposes of the present invention it is usually preferable to employ the $C_nH_{2n-4}S_3$ compounds in relatively pure state in order that isolation of the acid products formed by the hydrolysis reaction may be effected as readily as possible. If desired, however, the crude sulfurized olefines may be hydrolyzed directly as they are obtained from the sulfurization reaction.

The hydrolysis reaction is preferably carried out in an open vessel at reflux temperature under atmospheric pressure, but if desired it may be effected at higher temperatures under increased pressure. The hydrolytic agent employed may be any aqueous alkaline agent, e. g., sodium hydroxide, potassium hydroxide, calcium hydroxide, barium hydroxide, sodium carbonate, potassium carbonate, etc. For reasons of economy, the alkali-metal hydroxides, e. g., sodium hydroxide, are usually preferred. The aqueous alkaline agent may be of any concentration ranging from as low as about 0.5 per cent by weight to 50 per cent by weight or even higher, and is usually employed in an amount representing between about 4 and about 8 moles of the alkali per mole of sulfurized olefine. The time required for completion of the reaction depends upon the particular aqueous alkaline agent employed and its concentration, as well as upon the temperature employed and the particular sulfurized olefine being hydrolyzed. Ordinally, however, the reaction is completed in from 0.5 to 25 hours.

Upon completion of the reaction, the crude reaction product, which contains the desired acid products in the form of their metal salts along with by-product organic sulfides, disulfides, thioacids, etc., may be treated in any of several ways to recover the desired acids. According to one mode of procedure, the crude product is treated with a mineral acid until it is distinctly acid and hydrogen sulfide is no longer evolved. The acidified mixture is then steam distilled to obtain an aqueous distillate from which the desired acid products may be recovered in any suitable manner, e. g., by solvent extraction, by azeotropic distillation, or by precipitation as a metal salt. According to another mode of procedure, the crude reaction product may be treated with an alkaline oxidizing agent, such as hydrogen peroxide, to convert the by-product sulfur compounds to sulfates, and the oxidized product is then neutralized and steam distilled to obtain an aqueous distillate from which the desired acids may be recovered as previously described. Alternatively, the oxidation step may be replaced by one of alkylation, for example with a dialkyl sulfate, to convert the sulfur-containing by-products to alkyl derivatives.

The following examples will illustrate several ways in which the principle of the invention has been applied, but are not to be construed as limiting the same. All proportions are given as parts by weight.

*Example I*

Approximately 204 parts (1 mole) of the compound $C_8H_{12}S_3$ melting at about 87° C. and about 200 parts (5 moles) of sodium hydroxide dissolved in 2000 parts of water were placed in a flask fitted with a stirrer and a reflux condenser. The $C_8H_{12}S_3$ compound was the orange crystalline product separated by fractional crystallization from the product obtained by reacting di-isobutylene with sulfur at a temperature of about 170° C. and under a pressure of about 150 p. s. i. The mixture of $C_8H_{12}S_3$ compound and aqueous sodium hydroxide was heated with stirring at reflux temperature for about 4 hours, after which the heat was removed and 260 parts of concentrated sulfuric acid was added in small portions. During the addition of the acid, hydrogen sulfide was evolved from the mixture and considerable heat was generated. When all of the sulfuric acid had been added, the organic acids separated from the mixture as a dark red supernatant oil. The flask was fitted with a distillation condenser and steam inlet, and the mixture was steam distilled until no more of the oily product passed over. The oily layer of the distillate was decanted, and the aqueous layer was extracted twice with diethyl ether. The two ether extracts were combined with the oily layer, and the combined product was dried over anhydrous sodium sulfate, and was finally fractionally distilled. After removal of the ether fraction there was obtained 106 parts of a light straw-colored liquid fraction distilling at 200°–215° C. This product was identified as 4,4-dimethyl-valeric acid by analysis and by conversion to its amide (melting at 140°–141° C.). It was formed in yield of about 80 per cent of theoretical.

*Example II*

A mixture of 204 parts of the $C_8H_{12}S_3$ isomer melting at about 80° C. and 200 parts of sodium hydroxide dissolved in 2000 parts of water were heated at reflux temperature as described in Example I. The $C_8H_{12}S_3$ compound was the reddish-orange crystalline product obtained by reacting di-isobutylene with sulfur at a temperature of about 170° C. and under autogenic pressure to form a mixture of two $C_8H_{12}S_3$ isomers, and thereafter separating such mixture by fractional crystallization from chloroform solution. After about 9.5 hours of heating at reflux temperature all of the $C_8H_{12}S_3$ compound had dissolved in the aqueous alkali. Heating was then discontinued and the solution was cooled to a temperature of about 25° C. and was treated with 1008 parts of dimethyl sulfate. The methylated product was extracted with diethyl ether, and the aqueous raffinate was acidified with sulfuric acid and again extracted with ether. The second ether extract was then fractionally distilled, whereby there was obtained 59 parts (59 per cent of theoretical) of trimethyl-acetic acid, identified by its boiling point at 159° C. and by conversion to its amide (melting at 153°–154° C.) and to its ethyl ester (boiling at 115°–116° C.).

*Example III*

A mixture of 14.8 parts of the reddish-orange crystalline compound $C_4H_4S_3$ obtained by the sulfurization of isobutylene and about 31 parts of sodium hydroxide dissolved in about 500 parts of water was heated at reflux temperature for about 2 hours as described in Example I. The mixture was then treated with about 103 parts of 30 per cent aqueous hydrogen peroxide added in small portions at room temperature. The oxidized mixture was acidified with sulfuric acid and was distilled. The distillate was extracted with diethyl ether, and the ether extract was fractionally distilled to obtain a fraction boiling at 136°–137° C., identified as propionic acid. In a similar experiment, analysis of the acidified mixture showed the presence of formic acid, thus indicating that both formic and propionic acids are formed by the hydrolysis reaction.

*Example IV*

The $C_5H_8S_3$ compound obtained by reacting 2-methyl-butene-2 with sulfur was hydrolyzed with aqueous barium hydroxide and treated with dimethyl sulfate as described in Example II. The methylated product was extracted with ether, and the aqueous raffinate was acidified with sulfuric acid. Esterification of the acidified product with n-butyl alcohol yielded n-butyl propionate, indicating propionic acid to be a product of the hydrolysis reaction.

While the preceding examples illustrate the practice of the invention as applied to the preparation of organic acids from relatively pure sulfurized olefine compounds, it is to be understood that the invention is equally applicable to the sulfurized olefine products in crude form as they are obtained directly from the sulfurization reaction. For example, when di-isobutylene is reacted with sulfur at elevated temperatures and pressures there is initially obtained a dark oily liquid reaction product comprising the two $C_8H_{12}S_3$ compounds melting at about 80° C. and 87° C., respectively, unreacted sulfur, dissolved hydrogen sulfide, and organic sulfur compounds of unknown constitution. For the purpose of the present invention, this crude product need not be subjected to any purification treatment but may be reacted directly with an alkaline agent as herein described to obtain a mixture of organic acids which may be separated by conventional means. Also, a mixture of olefines such as is formed by cracking petroleum distillates may be sulfurized to obtain a mixture of sulfurized olefines of varying molecular weights, and such sulfurized mixture may be hydrolyzed directly in accordance with the invention.

Other modes of applying the principle of our invention may be employed instead of those explained, change being made as regards the process herein disclosed, provided the step or steps stated by any of the following claims, or the equivalent of any such stated step or steps, be employed.

We, therefore, particularly point out and distinctly claim as our invention:

1. The process for preparing aliphatic carboxylic acids which comprises hydrolyzing a sulfurized tertiary mono-olefine of the formula $C_nH_{2n-4}S_3$, wherein $n$ represents an integer from 4 to 16, in an aqueous alkaline solution, and recovering an aliphatic carboxylic acid from the resulting hydrolysis product.

2. The process for preparing aliphatic carboxylic acids which comprises hydrolyzing a sulfurized tertiary mono-olefine of the formula $C_nH_{2n-4}S_3$, wherein $n$ represents an integer from 4 to 16, in an aqueous alkali metal hydroxide solution, and recovering an aliphatic carboxylic acid from the resulting hydrolysis product.

3. The process for preparing aliphatic carboxylic acids which comprises hydrolyzing a sulfurized tertiary mono-olefine product with an aqueous alkaline agent, said sulfurized tertiary mono-olefine product being the product obtained by reacting a mixture of tertiary mono-olefines containing from 4 to 16 carbon atoms with elemental sulfur at a temperature between about 140° C. and about 350° C. under autogenous pressure.

4. The process for preparing aliphatic carboxylic acids which comprises hydrolyzing a sulfurized tertiary mono-olefine product with an aqueous alkali-metal hydroxide, said sulfurized tertiary mono-olefine product being the product obtained by reacting a tertiary mono-olefine containing from 4 to 16 carbon atoms with elemental surfur at a temperature between about 140° C. and about 350° C. under autogenous pressure.

5. The process for preparing aliphatic carboxylic acids which comprises hydrolyzing a compound of the formula $C_4H_4S_3$ with an aqueous alkaline agent, said compound being the reddish-orange crystalline product melting at about 40° C. obtained by reacting isobutylene with elemental sulfur at a temperature between about 140° C. and about 350° C. under autogenous pressure.

6. The process for preparing trimethyl-acetic acid which comprises hydrolyzing a compound of the formula $C_8H_{12}S_3$ with an aqueous alkaline agent, said compound being the reddish-orange crystalline product melting at about 80° C. obtained by reacting di-isobutylene with elemental sulfur at a temperature between about 140° C. and about 350° C. under autogenous pressure.

7. The process for preparing 4,4-dimethyl-valeric acid which comprises hydrolyzing a compound of the formula $C_8H_{12}S_3$ with an aqueous alkaline agent, said compound being the orange-colored crystalline product melting at about 87° C. obtained by reacting di-isobutylene with elemental sulfur at a temperature between about 140° C. and about 350° C. under autogenous pressure.

8. The process which comprises heating a sulfurized tertiary mono-olefine product with an aqueous alkaline agent at reflux temperature until reaction is substantially complete and thereafter recovering at least one aliphatic carboxylic acid from the reaction product, said sulfurized tertiary mono-olefine product being the product obtained by reacting a tertiary mono-olefine containing from 4 to 16 carbon atoms with elemental sulfur at a temperature between about 140° C. and about 350° C. under autogenous pressure.

9. The process which comprises heating a sulfurized tertiary mono-olefine product with an aqueous alkaline agent at reflux temperature until reaction is substantially complete, treating the reaction product with an alkaline oxidizing agent, acidifying the oxidized product with a mineral acid, and recovering at least one aliphatic carboxylic acid from the acidified product, said sulfurized tertiary mono-olefine product being the product obtained by reacting a tertiary mono-olefine containing from 4 to 16 carbon atoms with elemental sulfur at a temperature between about 140° C. and about 350° C. under autogenous pressure.

10. The process which comprises heating a compound of the formula $C_nH_{2n-4}S_3$, wherein $n$ represents an integer from 4 to 16, with from about 4 to about 8 moles of sodium hydroxide in aqueous solutions of concentration from about 0.5 to about 50 per cent by weight at reflux temperature until reaction is substantially complete, acidifying the reaction product with a mineral acid, and recovering at least one aliphatic carboxylic acid from the acidified product, said compound being obtained by reacting a tertiary mono-olefine of $n$ carbon atoms with elemental sulfur at a temperature between about 140° C. and about 350° C. under autogenous pressure.

11. The process which comprises heating a compound of the formula $C_4H_4S_3$ with from about 4 to about 8 moles of sodium hydroxide in aqueous solution of concentration from about 0.5 to about 50 per cent by weight at reflux temperature until reaction is substantially complete, acidifying the reaction product with a mineral acid, and recovering at least one aliphatic carboxylic acid from the acidified product, said compound being obtained by reacting isobutylene with elemental sulfur at a temperature between about 140° C. and about 350° C. under autogenous pressure.

12. The process which comprises heating a compound of the formula $C_8H_{12}S_3$ with from about 4 to about 8 moles of sodium hydroxide in aqueous concentration of from about 0.5 to about 50 per cent by weight at reflux temperature until reaction is substantially complete, acidifying the reaction product with a mineral acid and recovering at least one aliphatic carboxylic acid from the acidified reaction product, said compound being obtained by reacting di-isobutylene with elemental sulfur at a temperature between about 140° C. and about 350° C. under autogenous pressure.

13. The process for preparing aliphatic carboxylic acids which comprises hydrolyzing sulfurized isobutylene of the formula $C_4H_4S_3$, in an aqueous alkaline solution, and recovering an aliphatic carboxylic acid from the resulting hydrolysis product.

14. The process for preparing aliphatic carboxylic acids which comprises hydrolyzing sulfurized isobutylene of the formula $C_4H_4S_3$, in an aqueous alkali metal hydroxide solution, and recovering an aliphatic carboxylic acid from the resulting hydrolysis product.

15. The process for preparing aliphatic carboxylic acids which comprises hydrolyzing sulfurized di-isobutylene of the formula $C_8H_{12}S_3$, in an aqueous alkaline solution, and recovering an aliphatic carboxylic acid from the resulting hydrolysis product.

16. The process for preparing aliphatic carboxylic acids which comprises hydrolyzing sulfurized di-isobutylene of the formula $C_8H_{12}S_3$, in an aqueous alkali metal hydroxide solution, and recovering an aliphatic carboxylic acid from the resulting hydrolysis product.

RODERICK S. SPINDT.
DONALD R. STEVENS.

REFERENCES CITED

The following references are of record in the file of this patent:

UNITED STATES PATENTS

| Number | Name | Date |
| --- | --- | --- |
| 2,312,750 | Cohen | Mar. 2, 1943 |
| 2,338,829 | Werntz | Jan. 11, 1944 |